United States Patent
Marino et al.

(10) Patent No.: US 6,777,951 B2
(45) Date of Patent: Aug. 17, 2004

(54) METHOD AND APPARATUS FOR DETECTING AND ISOLATING SHORTS AND OTHER TROUBLES ON A POLLING LOOP

(75) Inventors: Francis C. Marino, Dix Hills, NY (US); Jon C. Bruns, Central Islip, NY (US); Jean U. Millien, Massapequa, NY (US); John J. Ryan, Seaford, NY (US)

(73) Assignee: Honeywell International, Inc., Morristown, NJ (US)

( * ) Notice: Subject to any disclaimer, the term of this patent is extended or adjusted under 35 U.S.C. 154(b) by 43 days.

(21) Appl. No.: 10/269,417

(22) Filed: Oct. 11, 2002

(65) Prior Publication Data

US 2004/0070401 A1 Apr. 15, 2004

(51) Int. Cl.⁷ .............................................. G01R 31/08
(52) U.S. Cl. ...................................... 324/512; 324/528
(58) Field of Search ......................... 324/66, 500, 537, 324/538, 512, 528; 340/505, 506; 370/249

(56) References Cited

U.S. PATENT DOCUMENTS

| | | | |
|---|---|---|---|
| 5,134,691 A | * | 7/1992 | Elms ........................... 709/209 |
| 5,347,515 A | | 9/1994 | Marino ......................... 370/447 |
| 5,402,101 A | * | 3/1995 | Berger et al. ............ 340/286.02 |
| 5,721,530 A | * | 2/1998 | Right et al. ................... 340/521 |
| 6,721,283 B1 | * | 4/2004 | Marino et al. ............... 370/252 |
| 2002/0194547 A1 | * | 12/2002 | Christensen et al. ........... 714/43 |

OTHER PUBLICATIONS

Notifier Document "Intelligent Control Panel SLC Wiring Manual", Jul. 25, 2001, Rev C.

* cited by examiner

*Primary Examiner*—N. Lo
*Assistant Examiner*—Walter Benson
(74) *Attorney, Agent, or Firm*—Scully, Scott, Murphy & Presser

(57) ABSTRACT

An Addressable Electronic Switch (AES) is disclosed together with unique S/W (software) procedures for a system control to detect, locate, and isolate shorts, overloads, and other troubles, such as temporary breaks or disconnects, on a Vplex or similar 2-wire polling loop. The addressable electronic switches are placed at strategic locations throughout the polling loop, and are individually commanded by the system control to either connect or disconnect its respective branch from the rest of the polling loop, to locate and isolate a troubled area from the rest of the polling loop.

23 Claims, 10 Drawing Sheets

(Vplex Start Up)

(Vplex Start Up)

(Vplex Standard Polling)

METHOD AND APPARATUS FOR DETECTING AND ISOLATING SHORTS AND OTHER TROUBLES ON A POLLING LOOP

BACKGROUND OF THE INVENTION

When a permanent break occurs in one of the branches of a polling loop 2 wire cable, the devices which are affected are easily identified and enunciated by the security system control making it relatively simple for a service person to locate and repair the break. However, if a permanent short circuit or severe overload condition occurs on the polling loop, all of the devices on that loop can no longer communicate to the system's control, rendering the security system inoperative. Locating and repairing a break in the polling loop is much simpler than locating and repairing shorts or overloads on the loop, especially when the short or overload manifests itself only when polling loop power and signals are applied to the loop.

Present commercial security systems which use an Ademco polling loop, advertised as Vplex, periodically test the loop to detect a short or overload condition as it may occur somewhere on the loop, but they cannot locate where the trouble condition exists. The control's present reaction is to remove power from the loop and, after some time delay, re-apply power to the loop and re-test for the short or overload condition. The control has no course of action other than report the problem and continue to test the loop until the short or overload condition is removed by a service person.

Locating a Loop Short or Overload

To isolate the location of a short or overload condition on a polling loop requires significant time and effort even for skilled service personnel with suitable testing equipment. This is especially true in very large systems, in which many devices are distributed on the polling loop over several branches and thousands of feet of wire. In order to avoid this eventuality, some installers will "home run" all of the distributed sensors at a site to the inputs of all of their respective Vplex devices concentrated near the control's panel. They do this to facilitate locating and repairing troubled wire run(s) to the sensors. This is an inefficient and costly way of employing the Vplex polling loop system.

In order to properly use the Vplex polling system without concern for shorts or overloads which may occur after installation or in the future, the installer must be given an effective means of locating a short or overload condition no matter where it may occur on the loop.

Using Loop Isolator Modules

Some polling loop systems, such as that employed by Notifier, use relay-based, addressable short detection modules. They are designed to disconnect a shorted branch of the polling loop in order to keep the rest of the polling loop system operational. These modules are explained in the Notifier document, "Intelligent Control Panel SLC Wiring Manual", dated Jul. 25, 2001, Rev C. Each module employs special relay-based short detection circuits and manually-operated rotary switches to identify the address of the affected module and, therefore, the location of the troubled branch or section of the loop. However, the manual does not explain how the proper module disconnects its associated branch on the loop since a short may manifest itself on every device and isolator module throughout the loop.

The Notifier module, which may be similar to other modules used in the Fire/Burglary Industry, requires special circuits, usually including the use of a relay, which must determine that its associated branch is the only branch that has the shorted condition. It must then disconnect its branch from the loop and simultaneously report its switch address to the control to identify the location of the troubled area of the loop.

Such circuits are likely to be expensive if they are to be accurate and dependable in making such a determination. In addition, the circuits must be immune to various disturbances on the loop to prevent unnecessary branch disconnects by any of the modules distributed on the loop.

BRIEF SUMMARY OF THE INVENTION

The present invention provides a new Addressable Electronic Switch (AES) together with unique S/W (software) procedures for a system control to detect, locate, and isolate shorts, overloads, and other troubles, such as temporary breaks or disconnects, on a Vplex or similar 2-wire polling loop. It includes the use of unique inexpensive addressable electronic switches which are individually turned ON or OFF by the system control, to locate and isolate the troubled area on the loop. The addressable electronic switches are placed at strategic locations throughout the polling loop, and are individually commanded by the system control to either connect or disconnect its respective branch from the rest of the polling loop. In this way, the troubled area can be first located and then isolated from the rest of the polling loop.

The present invention provides an addressable electronic switch (AES) which can be applied to an Ademco Vplex or similar polling loop system. Although the following description of the invention relates to polling loop applications, such as Vplex polling loops, the present invention is equally applicable to any two-wire, DC-voltage powered, multi-branch, distribution system operating within its voltage and current limits. The present invention can be used in Class A fire polling loop applications wherein the detector circuit devices are connected in tandem in a return loop, or in Class B security polling loop systems wherein the detector circuits are connected in tandem or in parallel in branches that do not include return loops.

DETAILED DESCRIPTION OF THE INVENTION

Figure 1:
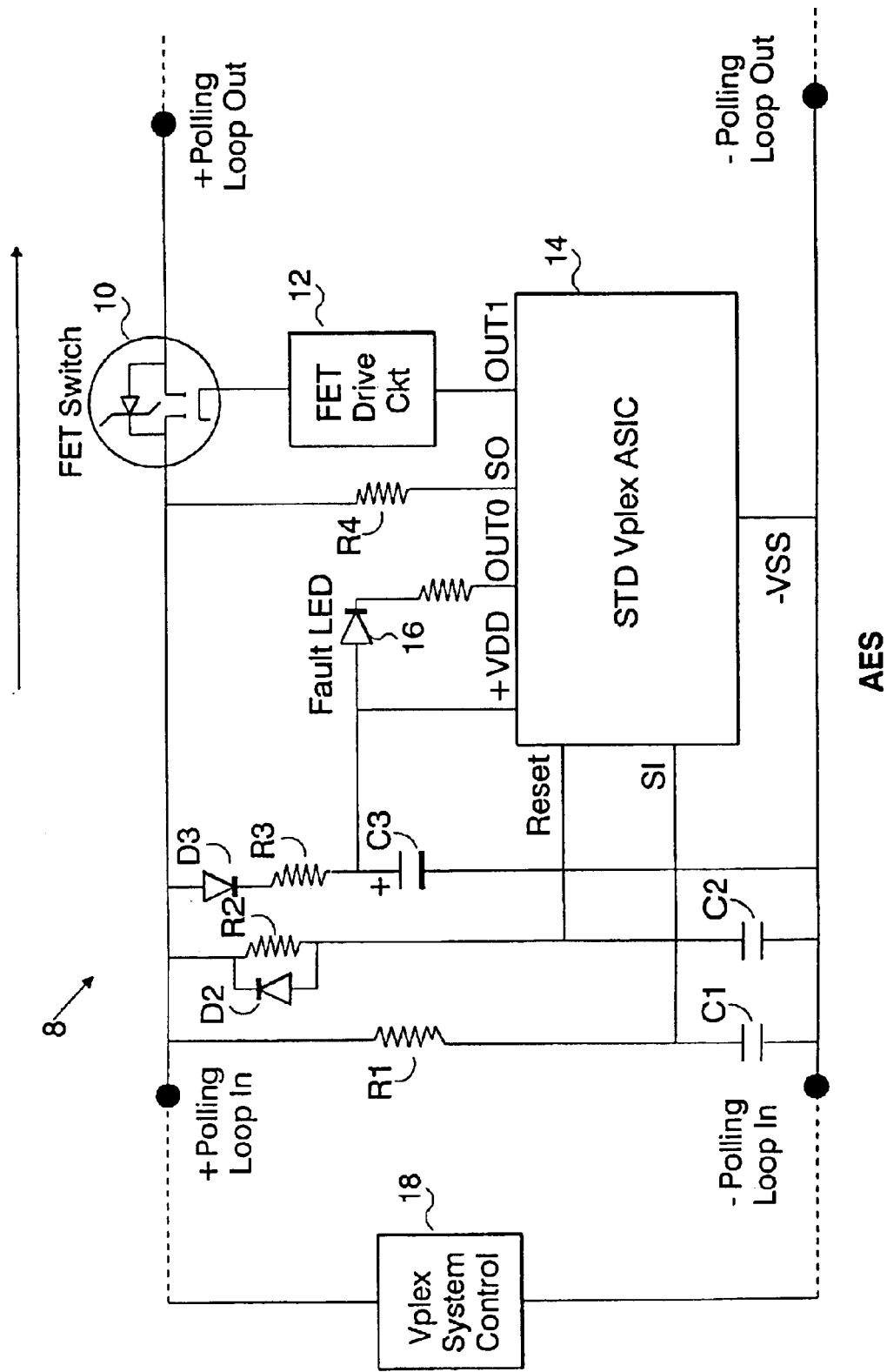
FIG. 1 is a block diagram of a Vplex Addressable Electronic Switch (AES) pursuant to the present invention for use in a uni-directional class B polling loop application.

FIG. 1 is a block diagram of a Vplex Addressable Electronic Switch (AES) 8 pursuant to the present invention for use in uni-directional Class B polling loop applications. When power is initially applied to the input side of the AES, a DC operating voltage is developed in the same manner as is done with all Vplex devices. The initial appearance of this voltage also results in the development of twice this voltage by a voltage doubler circuit, which is needed to operate MOSFET transistors which function as a closed switch during normal bi-directional Vplex signaling, or otherwise as a bi-directionally open switch to disconnect the output terminals from the input terminals. The AES 8 consists of a uni-directional FET Switch 10, driven by a FET switch drive circuit 12, which typically includes a voltage doubler circuit and a FET drive as shown in more detail in FIGS. 4–6. The FET switch drive circuit functions as a low impedance electronic switch under control of either a standard Vplex ASIC 14 or a new smart Vplex ASIC.

The standard Vplex ASIC 14 includes a serial input SI, a serial output SO, a Reset input, and two controlled outputs OUT0 and OUT1. A resistor R1 and capacitor C1 filter out noise from the serial input SI. A resistor R2, diode D2 and capacitor C2 filter out noise from the Reset input, and a rectifying diode D3, resistor R3 and capacitor C3 develop a rectified DC power supply, all as is known in the art.

The AES is connected to the polling loop at its input by terminals Polling Loop In and is connected to the polling loop at its output by terminals Polling Loop Out. The Vplex ASIC 14 is powered and used on the 2-wire polling loop in the same manner presently employed in Vista commercial systems. In such a 2-wire polling loop, a plurality of serially addressable devices are connected to transmit to or from a central control 18 via a two-wire polling loop. The transmissions of data are via a tri-level line signal to provide both power and data transmission on the two-wire line, as described in U.S. Pat. No. 5,347,515. The device is serial number (S/N) addressable by the system control 18 via standard unit polls to control each of two outputs OUT0, OUT1 of the associated ASIC. In this way, the system control can turn the FET switch 10 ON or OFF via the ASIC's OUT1 circuit. It can also independently turn a Fault LED 16 ON or OFF, continuously or intermittently, via the ASIC's OUT0 circuit, to help physically locate the affected area of the polling loop.

The following description provides details of how the AES devices are used on standard or Class A polling loop configurations to isolate temporary breaks or disconnects on the polling loop. In Class A polling loops the detector circuit devices are connected in a return loop, with the system control connected to both ends of the return loop, as opposed to class B polling loop configurations wherein the detector circuit devices are connected in branches which do not have return loops.

Most polling loop short isolator systems employ relatively expensive, relay-based, modules which employ circuits to detect a short on the loop and disconnect the troubled area from the rest of the loop. Via some form of address identification, the module then communicates its address to the system control, thereby locating the (disconnected) troubled branch or area of the loop.

The present invention uses a different approach for isolating troubled sections of a polling loop, and restricts the system control 18 to be the sole detector of shorts, overloads, or other troubles on the loop. The system control 18 can, by turning ON and OFF addressable electronic switches distributed throughout the loop, locate and isolate troubled areas. It is more practical and economical for the system control to determine a troubled condition on the loop and to isolate the troubled area from the rest of the loop rather than by allowing every isolator module on the loop to detect and isolate shorts on the loop.

Using an Addressable Electronic Switch
Initial Polling Loop Power on Condition

When power is initially applied to each AES, its ASIC is configured to power on with both outputs in an open drain state, resulting in an opened FET switch 10 and an extinguished Fault LED 16. Therefore, at power on, the input side of the polling loop is disconnected from the output side of the loop. This condition is referred to as an opened loop at the given AES. The loop can be closed at a given AES only via a S/N unit poll from the system control 18 in which the associated ASIC's OUT1 circuit is commanded ON (shorted to VSS).

Identifying AES Devices on the Loop

Figure 2:
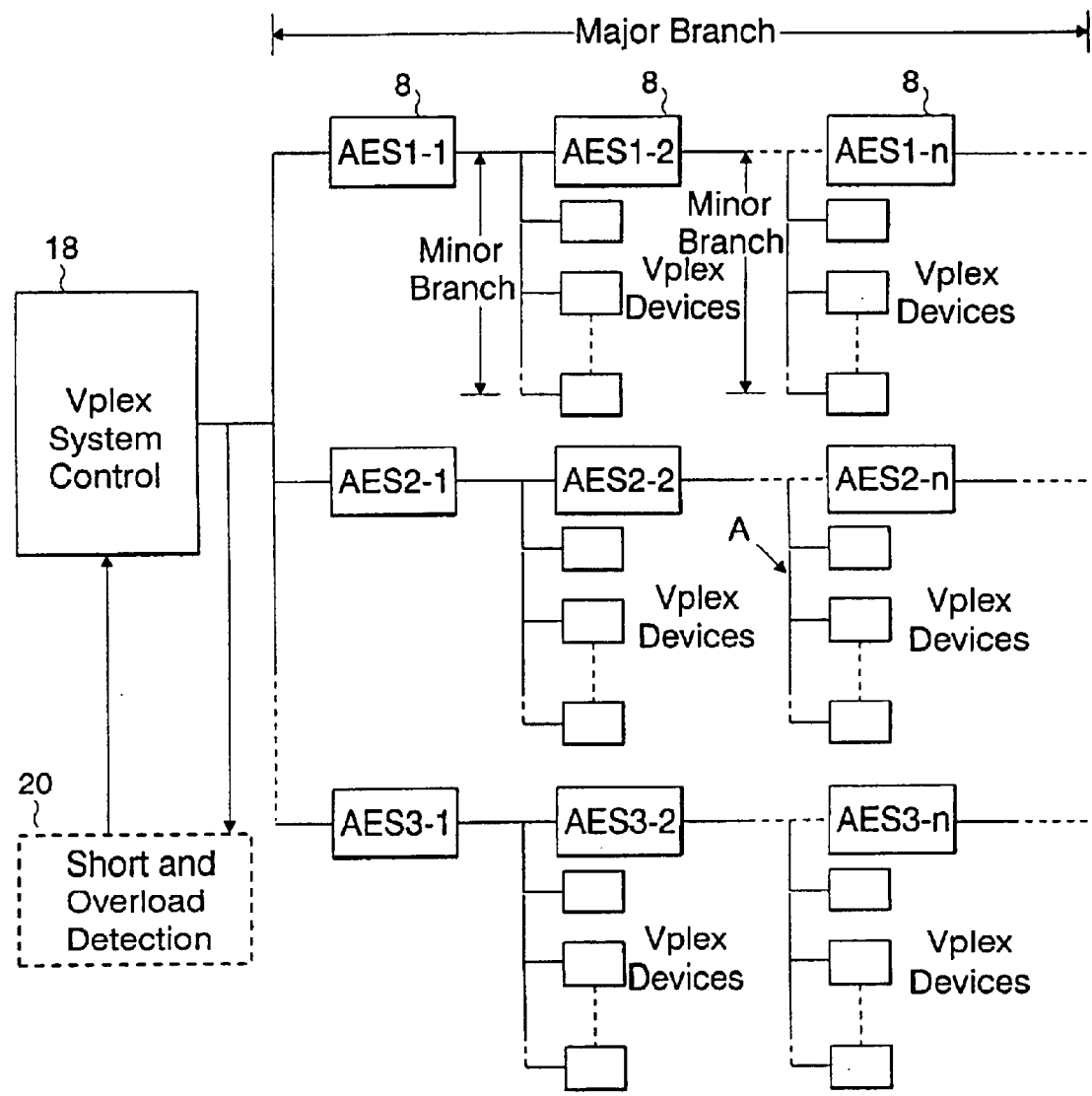
FIG. 2 illustrates an exemplary arrangement of Vplex polling loop branches with distributed AES devices in a uni-directional class B polling loop application.

Each AES device has a unique S/N address which is correlated to a specific branch or location on the polling loop for a given site plan, as exemplified in FIG. 2 which illustrates an exemplary arrangement of Vplex polling loop branches with distributed AES devices arranged in a Class B polling loop. The branch number and the serial location number of each of the AES devices are correlated to the ASIC's unique S/N. This correlation data is entered by the installer during the normal programming and enrollment procedures required by the system control. In this example, AES devices closest to the control are identified with the serial location number (−1) following their branch number.

Referring to FIG. 2, a single output of the Vplex system control panel 18 is input to three (3) branches, with the 1st AES in branch 1 identified as AES1-1, the 1st AES in branch 2 as AES2-1, and the 1st AES in branch 3 as AES3-1. In like manner AES1-2 is the 2nd AES device in branch 1, AES2-2 is the 2nd AES device in branch 2, etc. The Class B polling loop includes a Vplex system control 18 which is shown schematically as being provided with a short and overload detection means 20 as described in further detail below.

System Use of Distributed AES Devices

Upon initial application of power to the polling loop, all of the AES devices closest to the control 18 will power up with their ASIC 14 outputs turning off their FET switches 10 and Fault LEDs 16. The open FET switches of these closest AES devices will prevent loop power from reaching the further located AES and other Vplex devices on the loop.

To activate all of the previously enrolled AES and Vplex devices on the loop, the control 18 first turns on all of the 1st AES devices via S/N unit polls to those devices. If no short, overload, or other trouble is detected, the control proceeds to turn on the 2nd AES devices in each branch. Assuming no trouble is detected by the control 18, this process will continue until all of the AES devices are turned on. The control 18 then proceeds with its normal Vplex polling algorithms on a fully operational polling loop via all closed AES devices.

Locating a Short or Overload

Assume that a permanent short or severe overload is detected by the system control 18 when, say, AES2-2 is initially turned on, or at some future time, somewhere in the branch indicated by the arrow labeled (A) in FIG. 2. That trouble condition may disable all of the Vplex devices on the entire polling loop. Upon detecting the trouble condition using internal S/W (software) and H/W (hardware), the system control 18 will remove loop power and, after a typical delay presently used in Vplex systems, re-apply loop power. When the loop power is thus reapplied, all of the AES and Vplex devices will be without loop power except the 1st (opened) AES devices closest to the control.

The control then proceeds with the sequential turning on of each AES device in the sequential order described earlier. When AES2-2 is turned on, a short condition at (A) in FIG. 2 will be detected again by the control. This time, the control knows that the short occurred after AES2-2 was turned on. It powers down and up again to turn off all of the AES devices and then proceeds to turn all of the AES devices on in sequential order except for AES2-2. When addressing AES 2-2, the control turns on the Fault LED via the ASIC's OUT0, but maintains the ASIC's OUT1 in the open drain state to keep the FET switch 10 turned off to disconnect the troubled branch from the rest of the loop.

The trouble area is thus identified by the control 18 to be in the branch following the AES2-2 device. The illuminated Fault LED 16 is used to assist the installer or technician in physically locating the opened AES device and troubled branch. In the meantime, the rest of the Vplex system is returned to normal operation.

Overload Instead of Short

If an overload occurs instead of a short circuit on the loop some, if not all, of the Vplex devices may still be marginally functioning properly. The control can identify the location of the overload (due to a defective Vplex device, for example) by using the same method described above for locating the short condition. The sequential turning on of the AES devices stops when the control detects the overload corresponding to the turning on of the associated AES device.

Other Uses of the AES Device

The above method, of powering the polling loop down and then up followed by sequentially turning on AES devices, can be used by the control 18 to locate the branch or area of the loop that presents other malfunctions not yet being reported by present controls, such as extremely noisy branches, defective responses to unit or global polls, etc. In addition, since the AES device is basically an electronic switch, it may be used as an addressable switch to turn partitions, or other output devices, ON or OFF.

The unique method described here is based, firstly, on the system control 18 making the decision of what constitutes a loop malfunction or trouble, rather than every isolator module distributed on the loop and, secondly, individual control of distributed AES devices to locate and disconnect the trouble area(s) from the rest of the loop.

Using AES Devices on Class A Loops

Figure 3:
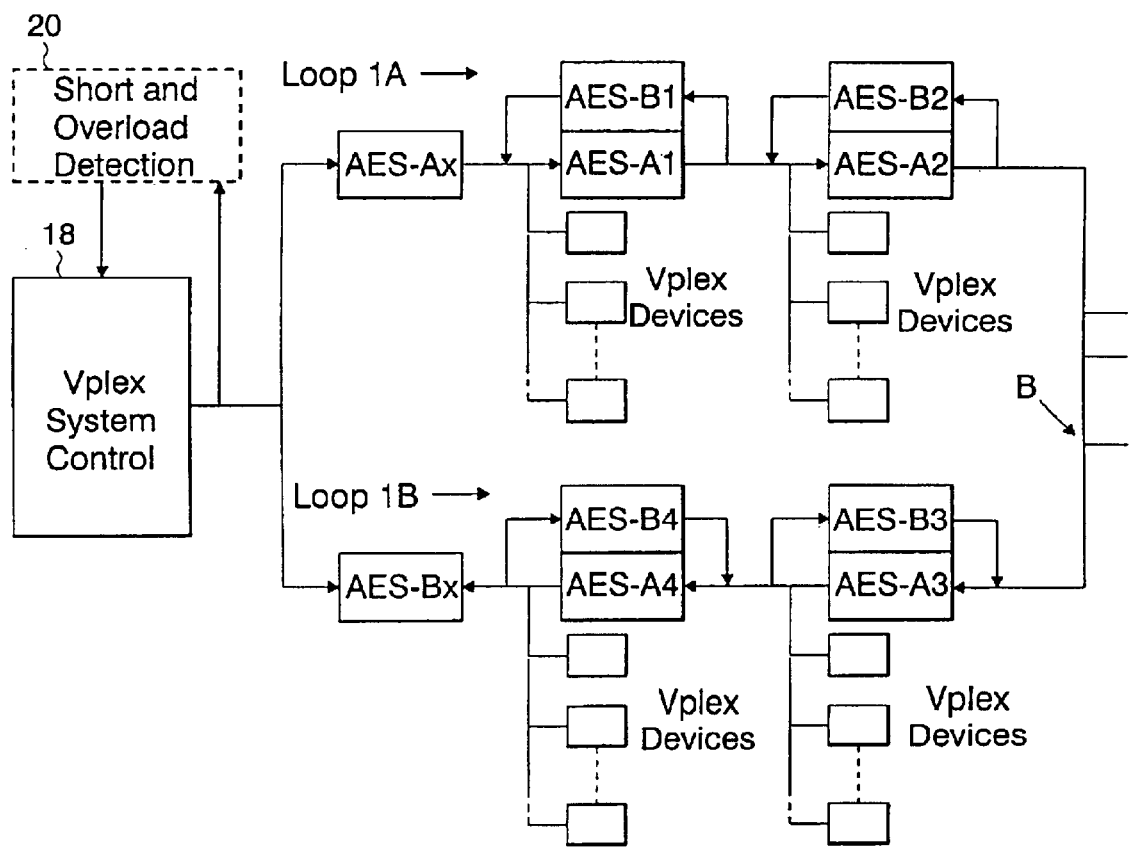
FIG. 3 illustrates a Vplex polling loop using AES devices connected in a bi-directional class A polling loop application.

FIG. 3 illustrates the use of multiple AES devices configured for a bi-directional class A Vplex loop application. LOOP 1A involves AES-Ax, AES-A1 . . . AES-A4 in ascending order. LOOP 1B involves AES-Bx, AES-B4 . . . AES-B1 in descending order. The normal operating loop is LOOP 1A used in the manner described above. LOOP 1B is activated when a trouble occurs in LOOP 1A in order to isolate the trouble more precisely between AES devices.

Note that when AES-A1 is closed, the loop voltage at its output causes AES-B1 to be open unless commanded to be closed by the system control via AES-A1. This is true for the remaining AES devices on this class A loop. Consequently, if a trouble occurs at the area indicated by the arrow (B), LOOP 1A will be operational up to AES-A2. LOOP 1B will then operate up to AES-B3, thus isolating the trouble to be between the AES devices A2/B2 and A3/B3. In the Class A polling loop of FIG. 3, which can include many Class A loops, the system control 18 essentially treats a short as a break which the system control 18 can handle.

Multiple Use of Class A Loops

The Class A loop configuration of FIG. 3 may be used more than once connecting to the same control 18 concurrently, and in conjunction with conventional parallel branch configurations per FIG. 2. Furthermore, the control 18 can communicate via the A and B loop paths simultaneously without negative effect due to the relatively low baud rate employed by the Vplex system. In this case, if a break occurs in the class A loop, all Vplex devices will continue to communicate to the control without error since the A and B loop paths are simultaneously in operation.

Single Bi-Directional AES Devices

Figure 4:
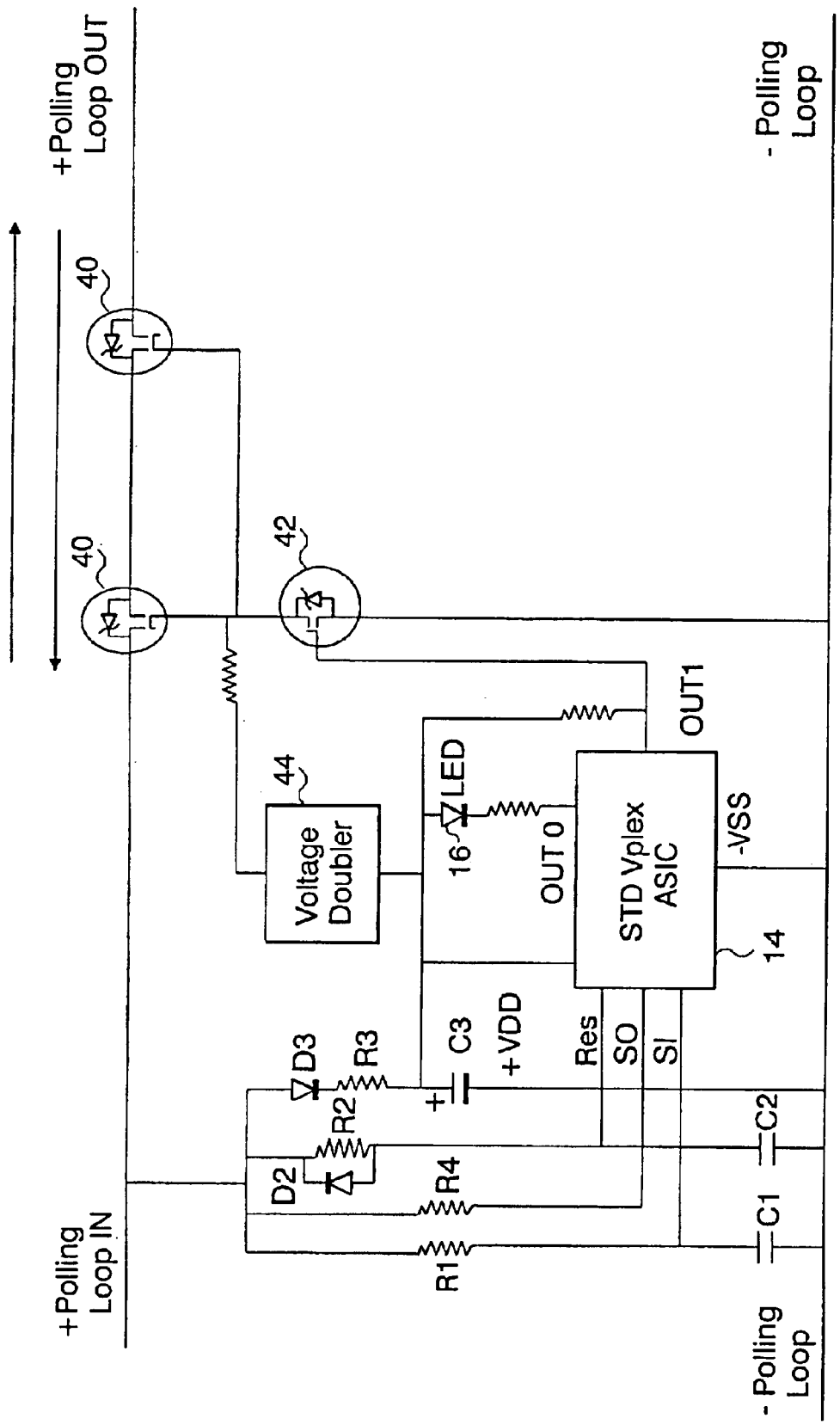
FIG. 4 illustrates a uni-directional AES device with FET switches configured for bi-directional class A loops.

FIG. 4 is a block diagram of each of the AES devices shown in FIG. 3. In order for the AES device to be used in bi-directional Class A loop applications, two uni-directional FET switches 40 which are connected back to back with opposite polarities, are driven by an FET drive 42 and powered by a Voltage Doubler circuit 44. This FET configuration allows pairs of AES devices 40, 40 to be connected end-to end permitting bi-directional use of the polling loop as illustrated in FIG. 3.

Figure 5:
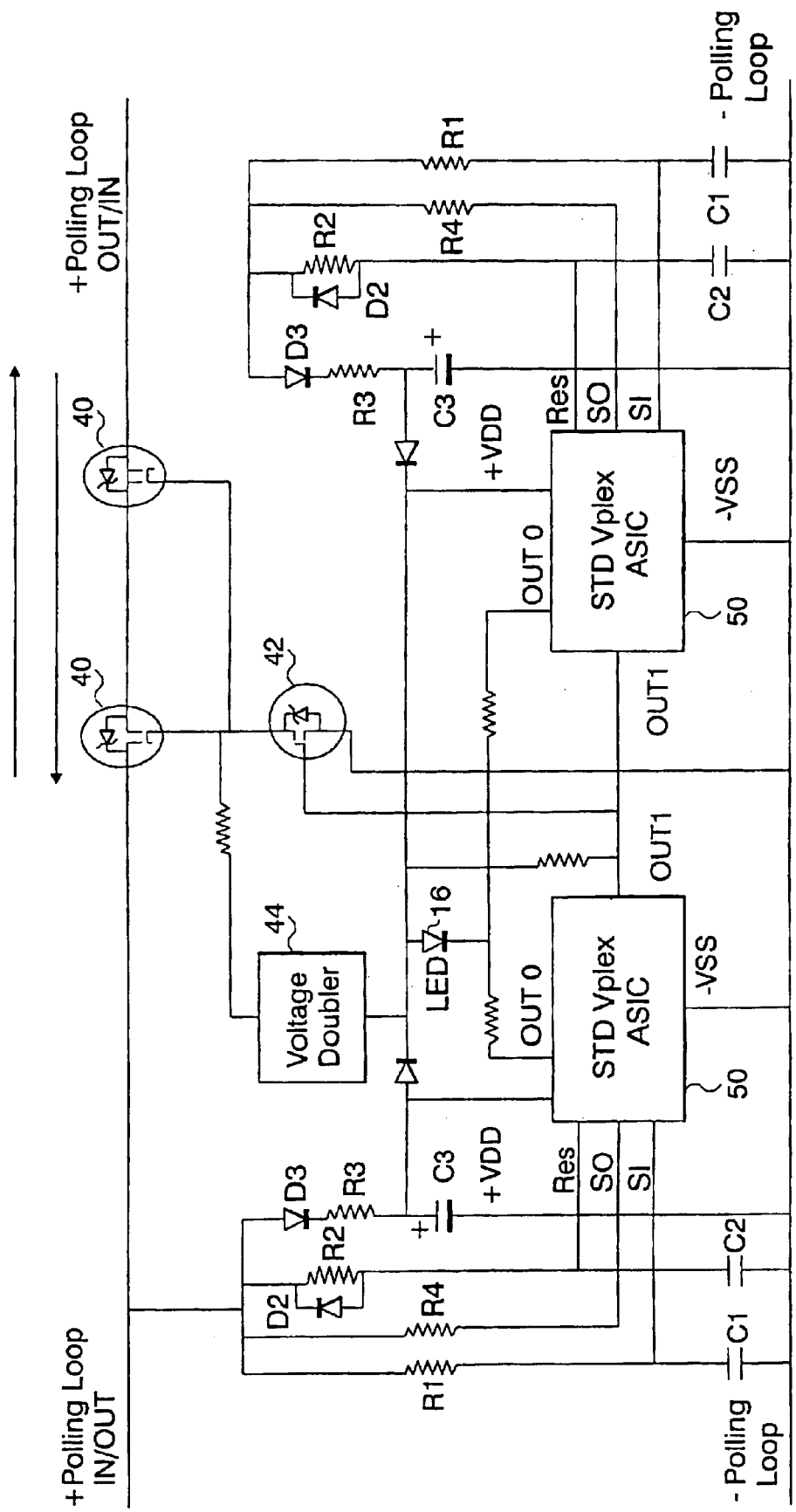
FIG. 5 illustrates a pair of AES devices combined into a single bi-directional AES device.

FIG. 5 illustrates how the single uni-directional AES device of FIG. 4 can be combined into a lower cost single bi-directional AES device by using two identical standard Vplex ASICs 50, 50, each having a different address.

Figure 6:
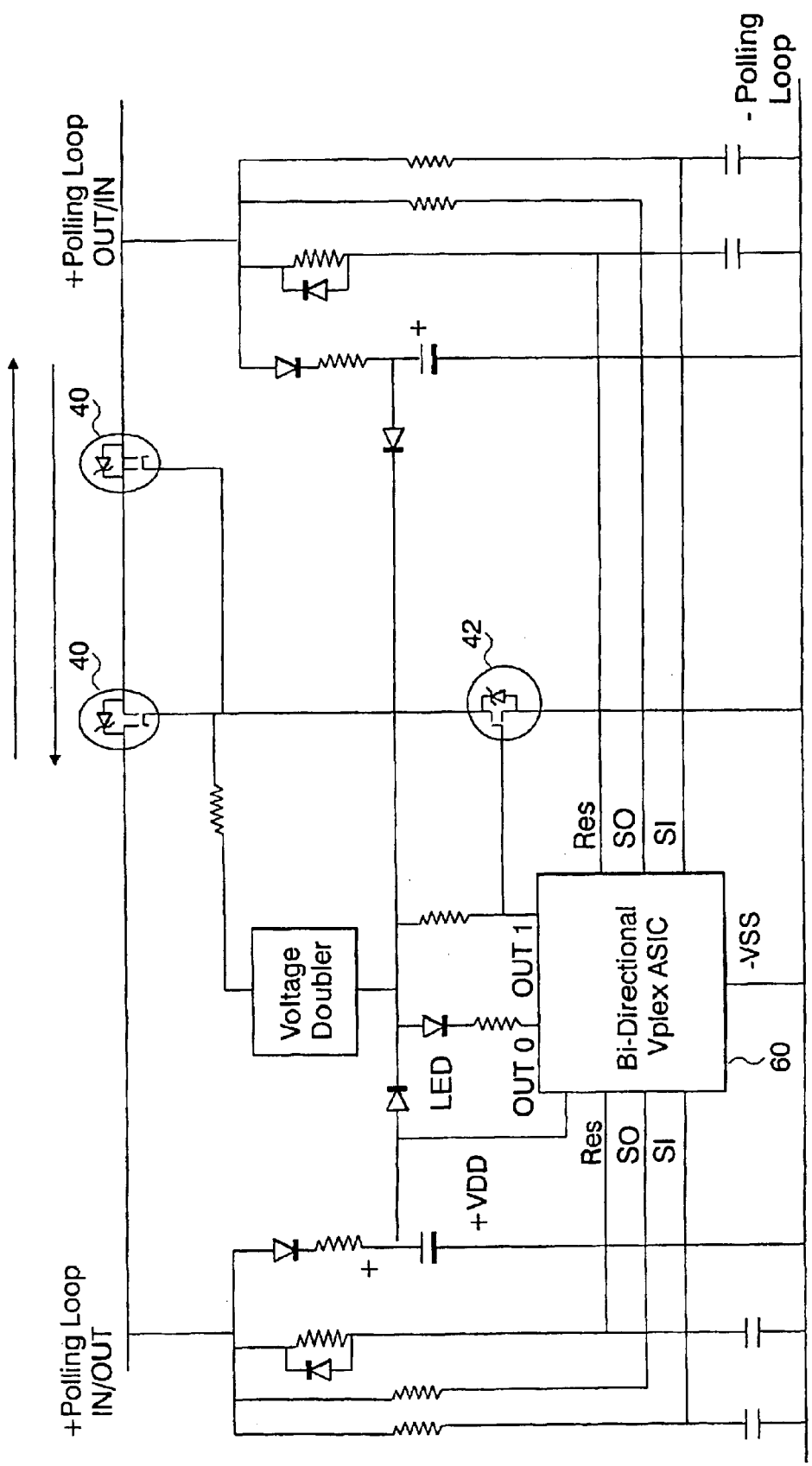
FIG. 6 illustrates a bi-directional AES device using a single bi-directional Vplex ASIC.

FIG. 6 illustrates how a bi-directional AES configuration can be further reduced in cost by utilizing a single bi-directional Vplex ASIC 60, which is a more complicated ASIC having two reset inputs Res, two serial data ins SI, and two serial data outs SO, rather than the standard Vplex ASICs of FIGS. 1, 4 and 5.

Intermittent Loop Troubles

The above explanation noted that a permanent break in one of the branches of a Vplex loop is easily identified by the system control 18. This is not true if the break, or a short, is intermittent such as can occur due to improper or partially damaged loop wiring. Controls cannot distinguish loss of communication to a Vplex device due to a defective device or an intermittent break or short in the loop. The result is intermittent trouble or false alarm conditions which are as difficult to locate and repair as would be the case with permanent shorts or overloads on the loop.

The AES as an Intermittent Trouble Detector

The AES device has the additional ability of being used as an intermittent trouble detector. This follows from its characteristic of powering up in the open loop state described earlier. Besides being used as addressable switches as previously described, if a temporary break or short occurs on the loop, power is temporarily removed and restored to the AES device located after the point of this temporary trouble. This causes that particular AES device to first power down and then power up in the open loop condition. Thus, the temporary break or short results in a permanent break in the associated branch by the given AES device following the location of this temporary trouble. This results in a permanent loss of communication to all Vplex devices following the open loop AES device.

The system control 18 can differentiate loss of communication due to a defective Vplex device from that resulting from a temporary trouble in the loop as follows:

Loss of communication to a Vplex device without at least one AES device opening its section of the loop indicates a normal defective Vplex device. That same loss of communication with at least one AES device in the open loop state indicates that the loss of communication may be due to a temporary break or short in that given section of the loop. Since the temporary trouble causes a permanent disconnect by the affected AES device, the involved branch is easily identified and isolated by the system control.

Using the AES Units

The Addressable Electronic Switch (AES) may be located on Vplex Polling Loops as exemplified in FIG. 2 which illustrates major and minor branches with distributed AES devices. Each Major branch starts with an AES unit located nearest the control, followed by pairs of additional AES units comprising Minor branches of Vplex devices throughout the Major branch.

The serial numbers (S/Ns) of the Vplex devices and their corresponding AES units must be enrolled into the system with relative branch location addresses assigned to each of the AES units. The S/Ns of all Vplex devices located between the addressable AES units per Minor branch is also enrolled into the system control. The control can then form a database which is a relative representation of the associated polling loop topology of a given Vplex polling loop installation.

The AES units can then be used to assist the control 18 in detecting and isolating branches which are permanently shorted, overloaded, or disconnected causing continuous supervision errors of the associated Vplex devices. It can also be used to differentiate supervision errors of defective Vplex devices from those due to transient shorts, overloads, or disconnects.

Figure 7A:
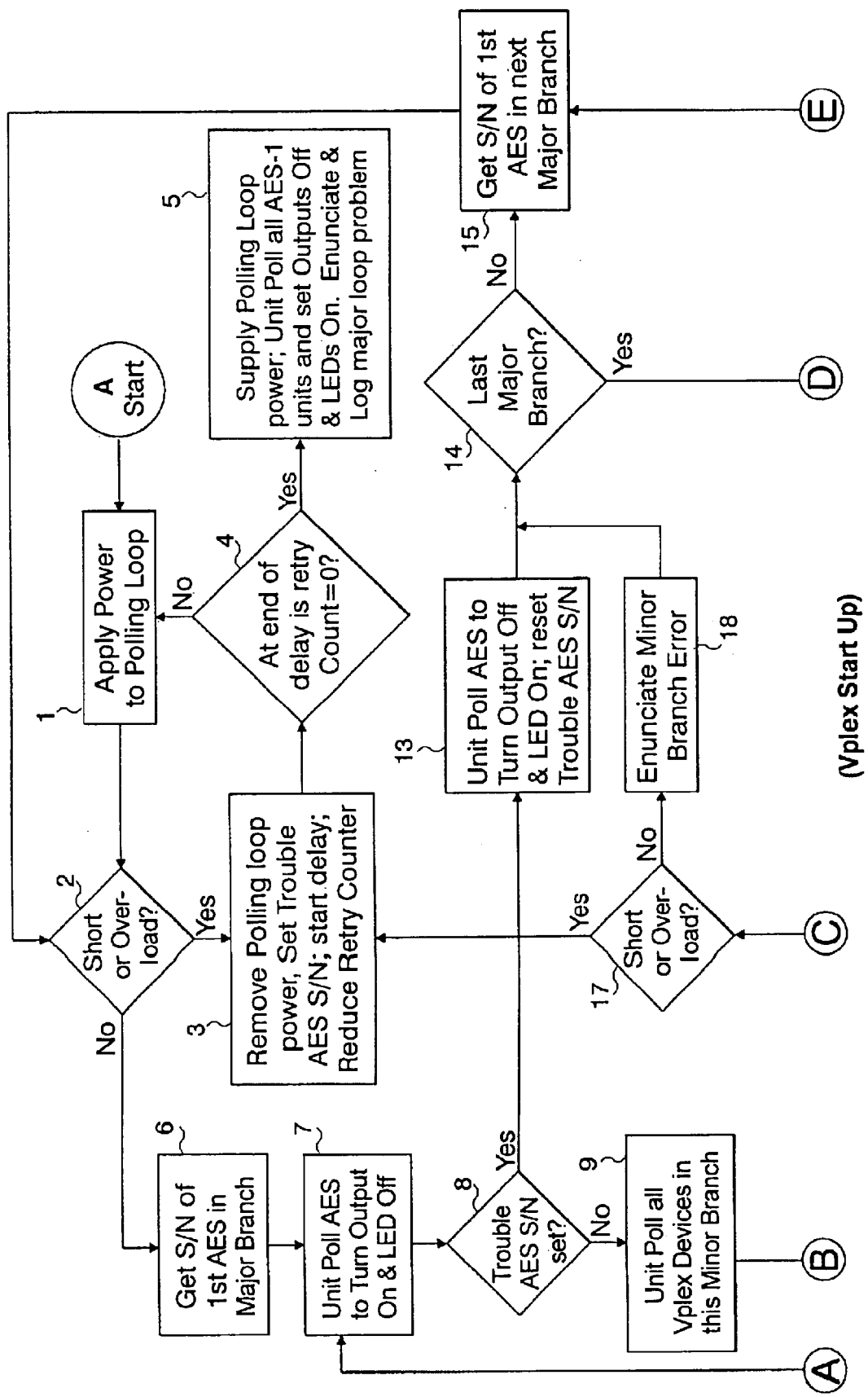
FIG. 7 is a sample logic flow diagram of a Vplex start up procedure.
Figure 7B:
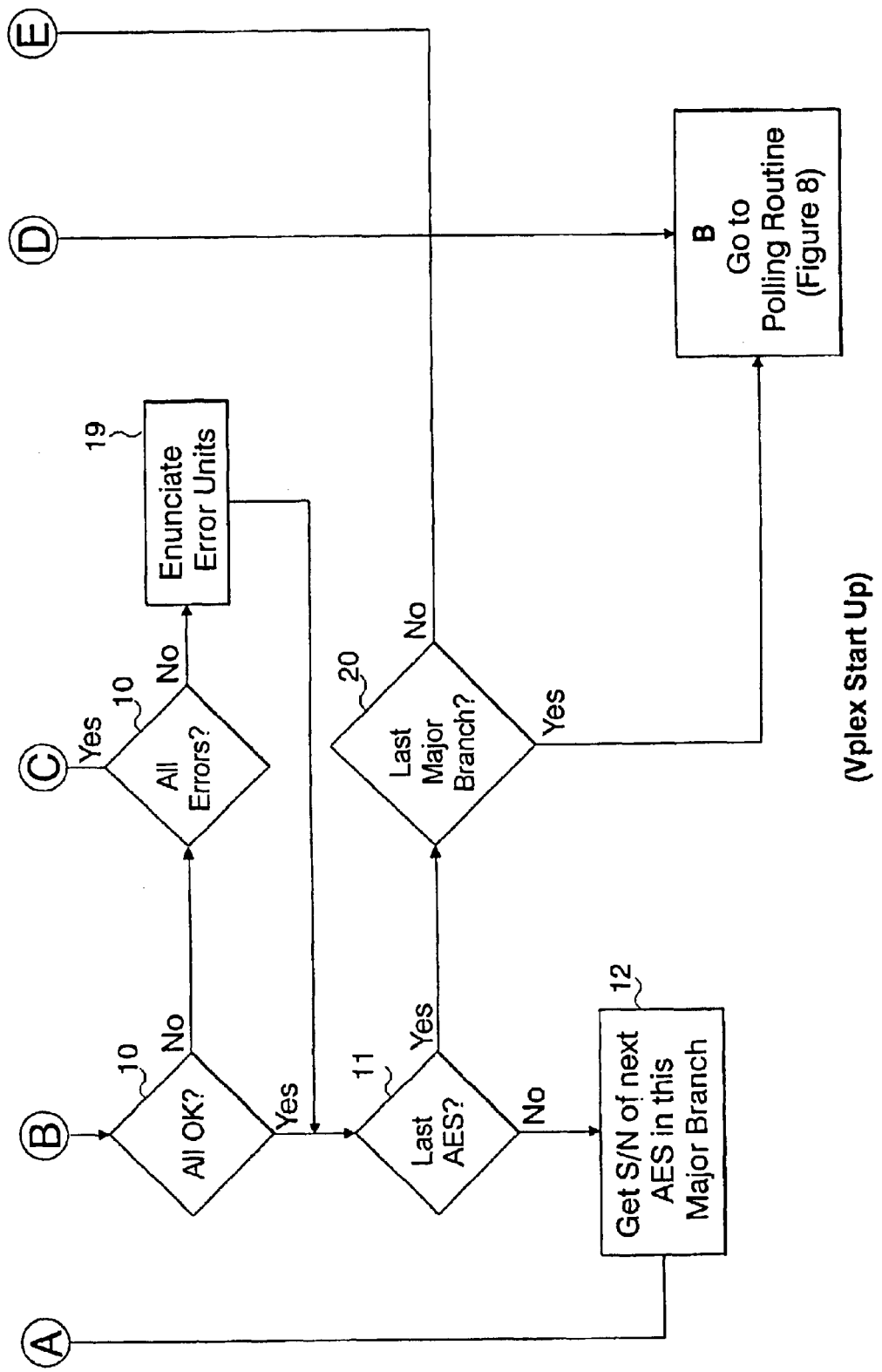
Figure 8A:
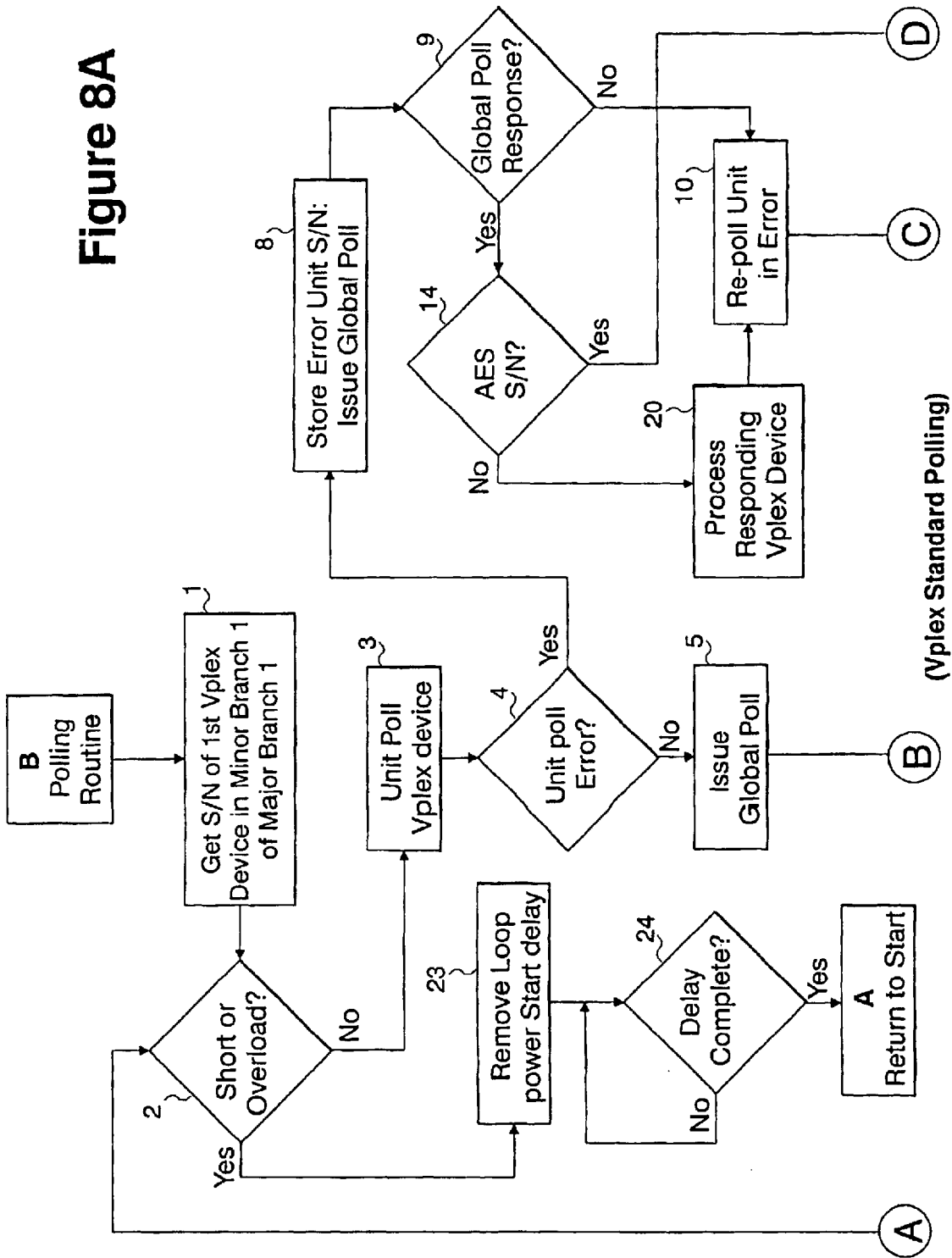
FIG. 8 is a sample logic flow diagram of a Vplex standard polling procedure.
Figure 8B:
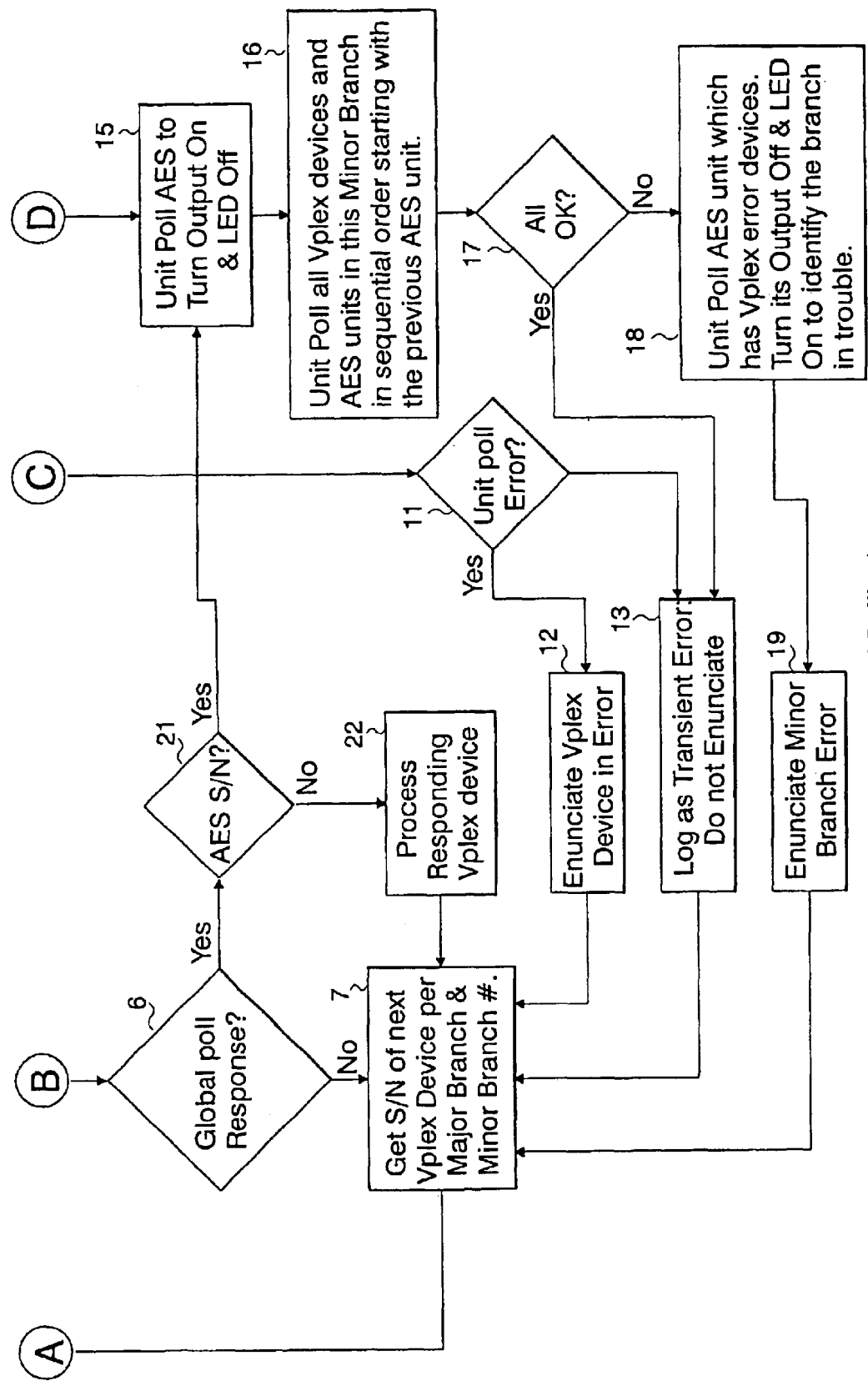

FIGS. 7 and 8 are sample logic flow charts for designing software for using the AES units to accomplish the tasks of the AES. Actual software employed may vary from that shown in FIGS. 7 and 8. FIG. 7 is a logic flow diagram of a Vplex start up procedure for powering up the polling loop and preparing the polling system for conventional polling of all of the Vplex devices on the loop. FIG. 8 is a logic flow diagram of a standard procedure for performing the standard Unit and Global polling of all of the Vplex devices on the loop. Both procedures provide the capability of detecting and isolating permanent or transient polling errors which may occur during the application of the standard polling algorithms.

To facilitate a discussion of both flow charts, each step in each flow chart has been parenthetically numbered ( ). Their use will become apparent in the course of the discussion which follows.

Vplex Start Up Procedure

FIG. 7 is a logic flow diagram of the Vplex start up procedure.

S1) From the Start step [A], power is applied and the control 18 tests the polling loop for shorts or overloads. If one of these troubles is detected and is permanent, sequence (1), (2), (3), (4) is repeated a pre-determined number of times until terminated with the action noted in step (5).

S2) If no trouble is initially detected, the control proceeds to sequentially turn on all of the AES units on the loop and Unit Poll each of the Vplex devices per minor branch throughout the loop. If no trouble is detected, sequence (6), (7), (8), (9), (10), (11), (12) repeats via step (7) until all of the AES and Vplex devices in a major branch have been successfully Unit Polled. This process continues via sequence (20), (15), (2), (6), (7)-(12) until terminated via a "YES" exit at step (20) moving on to the Polling Routine, [B].

S3) If a permanent error was detected at step (3) related to a specific AES unit, the associated AES unit S/N is remembered for later interrogation at step (8). To isolate the defective branch (es), sequence (8), (13), (14) are applied. If all of the defective branches have been thus identified and disconnected from the rest of the polling loop, the Polling Routine is entered from a "YES" exit from step (14).

S4) If defective Vplex devices are encountered during this Start Up Procedure, sequence (16), (19) applies. If all of the Vplex devices fail in a given minor branch, step (17) is invoked migrating toward step (3) or (18).

Vplex Polling Routine

The previous procedure should normally exit to the Polling Routine, [B] of FIG. 8 which is a logic flow diagram of the Vplex Polling Routine. AES devices are intentionally not Unit polled during this procedure in order to detect transient trouble conditions. This follows from the fact that a temporary short or disconnect in the loop causes the AES device of the affected branch to power off and to respond to Global Polls thus identifying the transient occurrence to the control. This will become more apparent during the discussion of this procedure.

P1) From [B], the loop is always tested for trouble shorts or overloads via sequence (1), (2). If a short or overload is detected, sequence (23), (24) will follow causing a return to the Start Up Procedure, [A], per FIG. 7.

P2) Normal interleaved Unit and Global Polling normally repeats via sequence (2), (3), (4), (5), (6), (7). All of the Vplex devices in all of the major and minor branches are thus conventionally polled.

P3) If a Unit Poll error occurs ("n" times) at step (4), sequence (8), (9), (10), (11) will follow if no Global Poll response occurs at step (9). The previous Vplex device is then re-polled at step (10) and, if the error repeats for this same device, step (12) is entered from a "YES" exit from step (11) indicating a verified ("n"-time) error for that device. The error is thus enunciated and responded to in the normal manner.

If this error is not repeated, step (13) is entered from a "NO" exit from step (11), indicating that the error was transient in nature. The Vplex device in error is logged as a transient error but is not enunciated at the control's 18 keypads. This prevents annoying reports and unnecessary audible enunciations of transient type errors such as might be due to temporary loop shorts or disconnects. However, it should be entered into the event log for future dispatching of a service person if the transients repeat in sufficient quantity and periodicity.

P4) If, following a Vplex device error stored in step (8), a Global Poll occurred in step (9), a query is made in step (14) to determine what type of device responded to the Global Poll. If no AES device responded, a temporary short or disconnect is presumed not to have occurred anywhere in the loop at this time. The procedure then continues with step (20) to process the Vplex device responding to that Global Poll. This is followed by step (10) to re-poll the earlier Vplex device that was in error to ascertain if that error may be considered transient or permanent via steps (12) or (13) resulting from step (11), as described earlier.

P5) If the Global Poll response in step (9) was from an AES device, sequence (15), (16), (17) follows. In step (15) the responding AES device, which was automatically turned off by a temporary short or disconnect in its associated Minor branch, must have its output turned on in order for the control to Unit poll all of the Vplex devices in the associated branch(es). This is accomplished via the sequence (16), (17). If all of the Vplex devices are OK, step (13) will follow a "YES" exit from step (17) indicating a transient trouble condition to be logged and not enunciated. If all of the Vplex devices are found not to be OK in step (17), the sequence (18), (19) will result, in which case the affected branch(es) must be disconnected from the polling loop and enunciated.

P6) In step (6), if a Global Poll is responded to, then step (21) inquires as to whether or not the response was from an AES unit. If not, the responding Vplex device is normally processed per step (22). However, if the response was from an AES unit, it means that a temporary or permanent short or disconnect occurred in the associated Minor branch. Sequence (15), (16), (17) is again applied to determine if this branch trouble was transient or permanent as previously discussed.

While several embodiments and variations of the present invention for a method and apparatus for detecting and isolating shorts and other troubles on a polling loop are described in detail herein, it should be apparent that the disclosed and teachings of the present invention will suggest many alternative designs to those skilled in the art.

What is claimed is:

1. A system for detecting and isolating shorts and troubles on a 2-wire polling loop comprising a plurality of Addressable Electronic Switch (AES) devices, each having an associated ASIC, by which an electronic switch in each AES is individually turned ON or OFF by a system control for the polling loop, wherein the 2-wire polling loop concurrently provides both operating power and polling signals to the AES devices and system devices, and the system control is the sole detector of troubles on the polling loop, and the AES devices function only as simple addressable switches on the polling loop, to enable the system control to detect and isolate troubles, wherein the AESs are placed at branch locations with associated branches throughout the polling loop, and each AES is individually commanded by the system control through its associated ASIC to either connect or disconnect its associated branch from the polling loop, such that the system control can, by turning ON and OFF particular addressable electronic switches distributed throughout the polling loop, locate and isolate troubled polling loop branches.

2. The system of claim 1, in a Vplex 2-wire polling loop, wherein each addressable electronic switch comprises a FET switch which functions as a low impedance electronic switch under control of its associated Vplex ASIC.

3. The system of claim 2, wherein each associated Vplex ASIC has a first output and second output, each Vplex ASIC is powered by and used on the Vplex 2-wire polling loop, and each Vplex ASIC is serial number addressable by standard polls to control the first and second outputs of the Vplex ASIC.

4. The system of claim 1, wherein each addressable electronic switch comprises a FET switch which functions as a low impedance electronic switch under control of its associated ASIC.

5. The system of claim 4, wherein each associated ASIC has a first output and second output, each ASIC is powered by and used on the polling loop, and each ASIC is serial number addressable by standard polls to control the first and second outputs of the ASIC.

6. The system of claim 5, wherein the system control turns the FET switch ON or OFF via the ASIC's first output, and also independently turns a Fault LED ON or OFF, continuously or intermittently, via the ASIC's second output.

7. The system of claim 6, wherein when power is initially applied to each AES, its associated ASIC is configured to power on with both outputs in an open drain state, resulting in an opened FET switch and an OFF Fault LED, and therefore, at power on, the input of the AES is disconnected from the output of the AES to disconnect its associated branch from the polling loop.

8. The system of claim 4, wherein for bi-directional Class A loop applications, each AES device comprises first and second uni-directional FET switches which are connected back to back with opposite polarities, which configuration allows bi-directional use of the polling loop.

9. The system of claim 1, wherein each AES device comprises a bi-directional AES device which uses two identical uni-directional ASICs, each having a different address.

10. The system of claim 1, wherein each AES device comprises a bi-directional AES device which uses a single bi-directional ASIC having two reset inputs, two serial data ins, two serial data outs, and two outputs.

11. The system of claim 1, wherein under a given site plan, the system control controls each AES device by a unique serial number address which is correlated to a specific branch location of the polling loop for the given site plan, and the branch number and the serial number of each of the AES devices are correlated to the ASIC's unique serial number.

12. The system of claim 11, wherein correlation data is entered by an installer during programming and enrollment procedures for use by the system control.

13. The system of claim 1, where after an initial application of power to the polling loop, all of first AES devices located closest to the system control power up with their associated ASIC outputs turning off their switches, and the open switches of the first closest AES devices prevent loop power from reaching further located second closest AES devices and devices on the polling loop, and the system control turns on all of the first closest AES devices via serial number polls to the first AES devices, and if no shorts or troubles are detected by the system control, the system control proceeds to turn on the second closest AES devices in each branch, and this continues until all of the AES devices in each branch are turned on.

14. The system of claim 13, wherein after all of the AES devices in each branch are turned on, the system control then proceeds with polling algorithms on a fully operational polling loop with all closed AES devices.

15. A method for detecting and isolating shorts and troubles on a 2-wire polling loop comprising placing a plurality of Addressable Electronic Switch (AES) devices, each having an associated addressable ASIC, at branch locations with associated branches throughout the polling loop, and a system control for controlling the polling loop, wherein the 2-wire polling loop concurrently provides both operating power and polling signals to the AES devices and system devices, and the system control is the sole detector of troubles on the polling loop, and the AES devices function only as simple addressable switches on the polling loop, to enable the system control to detect and isolate troubles, wherein the system control individually commands each AES device through its associated addressable ASIC to close or open an electronic switch to either connect or disconnect its associated branch from the polling loop, and the system control can, by turning ON and OFF particular addressable electronic switches distributed throughout the polling loop, locate and isolate troubled polling loop branches.

16. The method of claim 15, used in a 2-wire polling loop, wherein each addressable electronic switch comprises a FET switch which functions as a low impedance electronic switch under control of its associated ASIC.

17. The method of claim 16, wherein each associated ASIC has a first output and second output, each ASIC is powered by and used on the 2-wire polling loop, and each ASIC is serial number addressable by standard polls to control the first and second outputs of the ASIC.

18. The method of claim 17, wherein the system control turns the FET switch ON or OFF via the ASIC's first output, and the system control also independently turns a Fault LED ON or OFF, continuously or intermittently, via the ASIC's second output.

19. The method of claim 17, wherein when power is initially applied to each AES, its associated ASIC is configured to power on with both outputs in an open drain state, resulting in an opened FET switch and an OFF Fault LED, and at power on, the input of the AES is disconnected from the output of the AES to disconnect the associated branch from the polling loop.

20. The method of claim 15, wherein under a given site plan, wherein in the system control each AES has a unique serial number address which is correlated to a specific branch location of the polling loop for the given site plan, and the branch number and the serial number of each of the AES devices are correlated to the ASIC's unique serial number.

21. The method of claim 20, wherein an installer enters correlation data during programming and enrollment procedures for use by the system control.

22. The method of claim 15, where the system control, after an initial application of power to the polling loop, powers up all of first AES devices located closest to the system control with their associated ASIC outputs turning off their switches, and the open switches of the first closest AES devices prevent loop power from reaching further located second closest AES devices and devices on the polling loop, and the system control then turns on all of the first closest AES devices via serial number polls to the first AES devices, and if no shorts or troubles are detected by the system control, the system control proceeds to turn on the second closest AES devices in each branch, and this process continues until all of the AES devices in each branch are turned on.

23. The method of claim 22, wherein after all of the AES devices in each branch are turned on, the system control then proceeds with polling algorithms on a fully operational polling loop with all closed AES devices.

* * * * *